United States Patent [19]

Tsugawa et al.

[11] Patent Number: 4,705,817

[45] Date of Patent: Nov. 10, 1987

[54] METHOD OF PREVENTING THE RUST-FORMING AND ADHERENCE BETWEEN FRICTION MATERIAL AND OPPOSITE FRICTION MEMBER

[75] Inventors: Kazuo Tsugawa, Gyoda; Susuma Wada, Tatebayashi, both of Japan

[73] Assignees: Akebono Brake Industry Co., Ltd., Tokyo; Akebono Research and Development Centre Ltd., Hanyu, both of Japan

[21] Appl. No.: 921,199

[22] Filed: Oct. 21, 1986

[30] Foreign Application Priority Data

Oct. 31, 1985 [JP] Japan ................................ 60-244766

[51] Int. Cl.$^4$ .......................... C08J 5/14; C08K 3/22; C08K 3/38
[52] U.S. Cl. .................................... 523/152; 523/149; 523/153; 523/157
[58] Field of Search ................ 523/149, 152, 153, 157

[56] References Cited

U.S. PATENT DOCUMENTS 4,505,963  3/1985  Ogiwara .............................. 523/149

FOREIGN PATENT DOCUMENTS 3035100     5/1981   Fed. Rep. of Germany ...... 523/153
56-161438  12/1981  Japan .................................... 523/149
58-27772    2/1983   Japan .................................... 523/149
58-77934    5/1983   Japan .................................... 523/149

Primary Examiner—Allan M. Lieberman
Attorney, Agent, or Firm—Oblon, Fisher, Spivak, McClelland & Maier

[57] ABSTRACT

A method of preventing the rust-forming and adherence between friction material and opposite friction member by incorporating into the friction material a mixture or reaction product of boric acid and zinc oxide as an additive in an amount of 0.5 to 20 wt. %.

2 Claims, No Drawings

METHOD OF PREVENTING THE RUST-FORMING AND ADHERENCE BETWEEN FRICTION MATERIAL AND OPPOSITE FRICTION MEMBER

BACKGROUND OF THE INVENTION

The present invention relates to a method of preventing the rust-forming and adherence between friction material and opposite friction member.

Conventionally, the organic friction materials have been used as the friction materials for the brake or clutch of vehicles, which comprise mixtures of organic binder, reinforcement fibers such as asbestos, steel wool, glass fiber, rock wool, etc., friction modifier and the like, and the cast iron has been used in many cases as the opposite friction member.

These friction materials are used under every possible environments. For example, there is such a case as they are left alone for a long period of time at high temperature and high humidity in the rainy season or the like. In this case, there arise such problems as the rust-forming on the friction material and opposite friction member, the adherence between both materials resulting from said rust-forming, etc.

The invention solves these problems.

Also in the past, in the non-asbestos friction materials containing ferrous materials, such one as made to contain boric acid, phosphoric acid or salts thereof was proposed as an anti-rust agent in U.S. Pat. No. 4,363,884 for the prevention of the rust-forming and adherence of opposite friction member.

However, in the invention, the substance incorporated into the friction material as an additive are not the usual borates, such as borax, but a mixture of boric acid and zinc oxide or a reaction product of boric acid with zinc oxide.

SUMMARY OF THE INVENTION

The gist of the invention lies in a method of preventing the rust-forming and adherence between friction material and opposite friction member characterized in that a mixture or reaction product of boric acid and zinc oxide is incorporated as an additive in an amount of 0.5 to 20 wt.% into the friction material. Rust-forming of cast iron, which is an opposite friction member, is thereby eliminated and adherence between the friction material and the opposite friction material resulting from the rust-forming is obviated.

DETAILED DESCRIPTION OF THE INVENTION

The ratio of boric acid to zinc oxide in the mixture or the reaction product of boric acid with zinc oxide used in the invention can be set up in different ways depending on the object, but a range from 1/10 to 10/1 (by weight) is preferable.

Moreover, the amount of the mixture or the reaction product of boric acid and zinc oxide incorporated into the friction material is preferable 0.5 to 20 wt.%.

If less than 0.5% is incorporated, an insufficient improvement is realized, and, if more than 20% is incorporated, the increment in effect cannot be seen despite the increased amount that is incorporated.

The reaction product of boric acid with zinc oxide is a white powder with a melting point of about 930° to 960° C. which is obtained by allowing both to react at 500° to 1000° C. and which consists principally of zinc borate.

As described, the invention exerts an excellent improvement effect on the rust-forming and adherence between friction material and opposite friction member by the incorporation of a mixture or reaction product of boric acid and zinc oxide into the friction material.

EXAMPLE

To the friction material of the basic formulation as shown in Table 1 were added mixtures or reaction products of boric acid and zinc oxide as shown in Table 2 and the friction materials were molded by the usual method to prepare the articles of the invention 1 through 5. Moreover, for comparison, the friction material was molded similarly starting from the basic formulation (without additive) to prepare the comparative article. Results obtained from the tests of rust-forming and adherent force thereof are shown in Table 2.

TABLE 1

| Basic formulation (Parts by weight) | | |
| --- | --- | --- |
| Material for formulation | | Amount of formulation |
| Binder | Phenol resin | 10 |
| Reinforcement fiber | Asbestos | 50 |
| Friction modifier | Cashew dust | 5 |
| | Barium sulfate | 15 |
| | Graphite | 15 |
| | $Al_2O_3$ powder | 3 |
| | Copper powder | 15 |

TABLE 2

| Sample | Article of invention 1 | Article of invention 2 | Article of invention 3 | Article of invention 4 | Article of invention 5 | Comparative article |
| --- | --- | --- | --- | --- | --- | --- |
| Additive | Reaction product of boric acid with zinc oxide | | Mixture of boric acid with zinc oxide | | | None |
| Ratio: boric acid/zinc oxide | 71/29 | Same as left | 1/10 | 1/1 | 10/1 | — |
| Addition amount (% by weight) | 1 | 20 | 5 | 5 | 5 | — |
| Rust-forming | Small | Fine | Small | Small | Small | Middle to large |
| Adherent force kgf | 0-1 | 0 | 4-6 | 4-8 | 5-7 | 8-15 |

The conditions employed in the test methods of rust-forming and adherence aforementioned are as follows:

| | |
| --- | --- |
| Size of test piece | 25 × 25 × 5 (mm) |
| Opposite member | Cast iron |
| Areal press pressure | 5 kg/cm² |

The values in Table 2 show the results obtained by storing the article for a week at high temperature and high humidity (50° C., 95%) after having been dipped into distilled water.

What is claimed is:

1. A method of preventing the rust-forming and adherence between friction material and opposite friction member characterized in incorporating into the friction material a mixture or reaction product of boric acid and zinc oxide wherein said boric acid and zinc oxide are present in a weight ratio of 1:10 to 10:1 as an additive in an amount of 0.5 to 20 wt.%.

2. The method according to claim 1, wherein the reaction product comprises essentially zinc borate.

* * * * *